(12) United States Patent
Choi

(10) Patent No.: US 11,542,438 B1
(45) Date of Patent: Jan. 3, 2023

(54) HYDROTHERMAL CONVERSION OF PLASTIC TO OIL

(71) Applicant: SAUDI ARABIAN OIL COMPANY, Dhahran (SA)

(72) Inventor: Ki-Hyouk Choi, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 17/576,678

(22) Filed: Jan. 14, 2022

(51) Int. Cl.
*C10G 1/10* (2006.01)
*C10G 1/04* (2006.01)

(52) U.S. Cl.
CPC .............. *C10G 1/10* (2013.01); *C10G 1/047* (2013.01); *C10G 2300/1003* (2013.01)

(58) Field of Classification Search
None
See application file for complete search history.

(56) References Cited

U.S. PATENT DOCUMENTS

| | | | |
|---|---|---|---|
| 5,386,055 | A | 1/1995 | Lee et al. |
| 5,728,910 | A | 3/1998 | Matsubara et al. |
| 6,352,674 | B2 | 3/2002 | Matsubara et al. |
| 6,504,068 | B1 * | 1/2003 | Matsubara ............... C10G 1/10 201/2.5 |
| 8,809,606 | B2 | 8/2014 | Appel et al. |
| 9,725,655 | B2 | 8/2017 | Gephart et al. |
| 10,442,997 | B2 | 10/2019 | Narayanaswamy et al. |
| 10,894,870 | B2 | 1/2021 | Chen et al. |
| 2010/0160709 | A1 | 6/2010 | Grierson et al. |

FOREIGN PATENT DOCUMENTS

| | | |
|---|---|---|
| JP | 5819607 B2 | 11/2015 |
| KR | 102071286 B1 | 1/2020 |
| WO | 8100855 A1 | 4/1981 |

OTHER PUBLICATIONS

Czajczynska, "Potential of pyrolysis processes in the waste management sector", Thermal Science and Engineering Progress, vol. 3, 2017, pp. 171-197.
Fonseca, et al., Effects of steam on the thermal dehydrochlorination of poly(vinyl chloride) resin and flexible poly (vinyl chloride) under atmospheric pressure, Elsevier Polymer Degradation and Stability 117 (2015), pp. 8-15.

(Continued)

*Primary Examiner* — Philip Y Louie
(74) *Attorney, Agent, or Firm* — Bracewell LLP; Constance Gall Rhebergen

(57) ABSTRACT

Methods for utilizing a supercritical water unit to convert waste plastics to product through hydrothermal treatment in a supercritical unit are provided. Waste plastic is treated in a pretreatment unit, melting the plastic into a liquid and prepares the plastic for the supercritical water unit. The pretreatment unit can dehalogenate the waste plastic. The molten plastic is introduced into a supercritical water unit with water, which generates a product. A flushing stream of product and steam or water from the supercritical water unit is recycled from the supercritical water unit into the pretreatment unit, preheating and pretreating the waste plastic, and acting as a catalyst in the dechlorination reaction. A purge stream removes the products of the dehalogentation reaction occurring in the melting section.

20 Claims, 4 Drawing Sheets

(56) References Cited

OTHER PUBLICATIONS

Gollakota et al., A Reviewon Hydrothermal Liquefaction of Biomass, Renewable and Sustainable Energy Reviews, 81 (2018), pp. 1378-1392.

Kubatova, et al., "Dechlorination of Lindane, Dieldrin, Tetrachloroethane, Trichloroethene, and PVC in Subcritical Water", Environ. Sci. Technol. vol. 36, 2002, pp. 1337-1343.

Poerschmann, et al., "Hydrothermal carbonization of poly(vinyl chloride)", Elsevier Chemosphere, vol. 119, 2015, pp. 682-689.

Takeshita, et al., "Basic study on treatment of waste polyvinyl chloride plastics by hydrothermal decomposition in subcritical and supercritical regions", Elsevier The Journal of Supercritical Fluids, vol. 31, 2004, pp. 185-193.

Troitskii, et al., Investigation of autocatalytic thermal degradation of poly(vinyl_chloride) by ESR spectroscopy, Elsevier Polymer Degradation and Stability 58 (1997), pp. 83-89.

Wang, et al., "Low chlorine oil production through fast pyrolysis of mixed plastics combined with hydrothermal dechlorination pretreatment", Elsevier Process Safety and Environmental Protection, vol. 149, 2021, pp. 105-114.

Yao, et al., "A new approach to transforming PVC waste into energy via combined hydrothermal carbonization and fast pyrolysis", Elsevier Energy, vol. 141, 2017, pp. 1156-1165.

\* cited by examiner

HYDROTHERMAL CONVERSION OF PLASTIC TO OIL

FIELD

This disclosure relates methods for the conversion of waste plastics to oil. More specifically, this disclosure relates to methods of utilizing pretreatment units and supercritical water treatment units utilizing supercritical water and steam to convert waste plastics to oil.

BACKGROUND

Waste plastics are a significant problem in today's society. Plastics are generated at such a high rate, and are recycled at such a low rate, that plastics and plastic containing materials are a significant source of waste throughout the world. Therefore, new methods of utilizing waste plastics are necessary. Hydrothermal treatment of plastics allows for the depolymerization of the plastics generating oily hydrocarbons. Conventional hydrothermal treatment utilizes high temperatures and water or steam to degrade and depolymerize the plastics, and can also utilize high pressures to further process the plastics. A large portion of waste plastics, however, comprise polyvinylchloride (PVC). Waste plastic can contain 1 to 10 wt % of PVC. PVC can contain chlorine in large amounts, including in the range of 50 to 60 wt % chlorine. When PVC is incinerated, dioxins and other extremely toxic materials are released. PVC releases hydrochloric acid and chloroaromatic compounds when processed through anaerobic pyrolysis, so it is not preferred for these processes. When PVC is processed through hydrothermal processing or other conventional processes, the chlorine and other corrosive materials are released, which can cause severe corrosion in the system. Additionally, waste plastics contain other contaminants that are problematic in processing, clogging systems or generating unacceptable contamination in the final products. Therefore, novel processes are needed to address these deficiencies.

SUMMARY

The disclosure relates to methods for utilizing a supercritical water unit to convert waste plastics to product through hydrothermal treatment in a supercritical unit. The waste plastic is first treated in a pretreatment unit, which melts the plastic into a liquid and prepares the plastic for the supercritical water unit. The pretreatment unit can remove contaminants, and can also dechlorinate PVC. The pretreatment includes a melting section to heat waste plastics to a molten state, a porous disk to filter the molten plastic, and a liquid collection section. In the melting section, a dehalogenation reaction occurs to remove chlorine from the PVC plastics. A flushing stream of product and steam or water from the supercritical water unit is recycled from the supercritical water unit into the pretreatment unit, preheating and pretreating the waste plastic, and acts as a catalyst in the dechlorination reaction. The recycled effluent from the supercritical water reactor is utilized for hydrothermal treatment of PVC plastics during pretreatment. A purge stream removes the products of the dehalogentation reaction occurring in the melting section. The molten, dechlorinated plastic is introduced into the supercritical water unit featuring water and steam at supercritical conditions for water. Reactions occurring in the supercritical water unit include cracking, pyrolysis, dehydrogenation, hydrolysis, cyclization, aromatization, alkylation, dimerization, isomerization, as well as other reactions known in the art. The molten plastic is further processed within the supercritical water unit, generating a product stream. The product stream can include hydrocarbons, oils, and other polymer components.

Disclosed herein is a method of processing waste plastic including the steps of introducing waste plastic into a pretreatment unit, where the waste plastic comprises a halogen, and heating the waste plastic in the pretreatment unit so that molten plastic is generated. The method also includes the step of introducing the molten plastic into a supercritical water unit, where the supercritical water unit is operable at conditions at, near, or above supercritical conditions for water. The method further includes the steps of introducing a supercritical water stream to the supercritical water unit, and reacting the molten plastic in the supercritical water stream to generate a product, where the product comprises hydrocarbons. The method includes the steps of removing a flushing stream from the supercritical water unit, where the flushing stream includes product and water, and introducing the flushing stream from the supercritical water unit into the pretreatment unit.

In some embodiments, the method includes the steps of dehalogenating the molten plastic in the pretreatment unit, and removing a pretreatment purge from the pretreatment unit, where the pretreatment purge includes halogens, the product, and steam. The pretreatment unit includes a porous disk, which is operable to remove solid particulates from the molten plastic. The porous disk includes metal. In some embodiments, the flushing stream is introduced into the supercritical water unit at a pressure operable to force molten plastic through the porous disk, where the pressure is in the range of 0.5 MPa to 22 MPa. The product includes upgraded hydrocarbons.

In some embodiments, the waste plastic includes polyvinyl chloride (PVC). In these embodiments, the pretreatment purge includes chlorinated compounds. In some embodiments, the flushing stream is operable to dechlorinate the molten plastic and partially crack the molten plastic. The supercritical water unit operates at a pressure in the range of 22 MPa to 35 MPa, and a temperature in the range of 400° C. to 550° C.

Further disclosed herein is a method for the hydrothermal conversion of waste plastic to hydrocarbons, where the method includes the step of introducing waste plastic to a pretreatment unit. The waste plastic includes polyvinyl chloride (PVC). The method also includes the steps of introducing a flushing stream to the pretreatment unit, where the flushing stream includes water and hydrocarbons; melting the waste plastic in a melting section of the pretreatment unit; and dechlorinating the molten plastic in the melting section, generating a dechlorinated molten plastic. The method also includes the steps of removing a pretreatment purge from the melting section of the pretreatment unit, where the pretreatment purge comprises chlorine, hydrocarbons, and water; filtering the dechlorinated molten plastic through a porous disk, generating a cleaned molten plastic; introducing the cleaned molten plastic into a supercritical water unit; introducing a supercritical water stream into the supercritical water unit; and reacting the supercritical water stream and the cleaned molten plastic, generating hydrocarbons. The method also includes the steps of removing a product stream from the supercritical water unit, wherein the product stream includes hydrocarbons and water; and splitting the flushing stream from the product stream.

In some embodiments, the supercritical water unit operates at a pressure in the range of 22 MPa to 35 MPa, and a temperature in the range of 400° C. to 550° C. The method also includes the step of pumping the cleaned molten plastic, so that the pressure of the cleaned molten plastic is at or near pressure conditions for supercritical conditions for water. The step of reacting the supercritical water and the cleaned molten plastic includes hydrothermal conversion. In some embodiments, the flushing stream is operable to crack dechlorinated molten plastic.

In some embodiments, the method further includes the steps of separating the product stream in a separator, generating a gaseous product and a liquid product; and dechlorinating the pretreatment purge in a dechlorination process, generating a dechlorinated product. In some embodiments, the pretreatment unit operates at a pressure in the range of 0.5 MPa to 22 MPa, and a temperature in the range of 120° C. to 400° C. The porous disk is operable to remove solid particulates. In further embodiments, a plurality of pretreatment units are provided, and the pretreatment units are arranged in series. An overhead recycle is recycled from a second of the plurality of pretreatment units to a first of the plurality of pretreatment units.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

Figure 1:
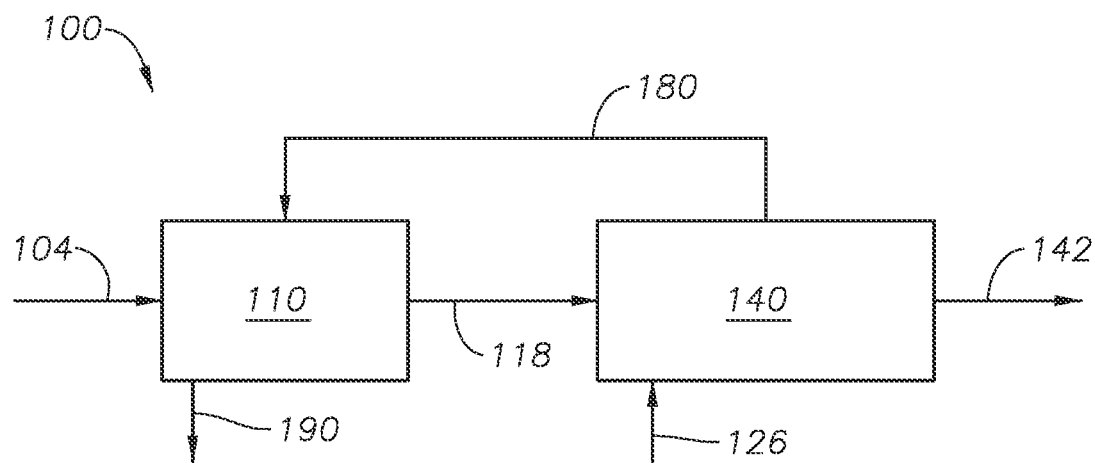
FIG. 1 is a diagram of a basic supercritical water plastic conversion process, according to an embodiment.

In the accompanying Figures, similar components or features, or both, can have a similar reference label. For the purpose of the simplified schematic illustrations and descriptions of FIGS. 1 through 5, the numerous temperature and pressure sensors, controllers, and the like that can be employed and well known to those of ordinary skill in the art are not included. Further, accompanying components that are in conventional industrial operations are not depicted. However, operational components, such as those described in the present disclosure, can be added to the embodiments described in this disclosure.

DETAILED DESCRIPTION

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

The present disclosure allows for the conversion of waste plastics into oil by utilizing supercritical water as a reaction medium as well as a reactant. Advantageously, supercritical water acts as an efficient heat transfer medium.

Advantageously, the present disclosure removes halogens, such as chlorine, from the plastic prior to the hydrothermal conversion in the supercritical water unit, reducing or preventing corrosion and preventing contamination of product hydrocarbons by chlorine. The flushing stream and pretreatment unit can also crack some of the molten plastic. The porous disks in the pretreatment units advantageously remove solid particulates, preventing the plugging of process lines, preventing contamination of the product, and reducing the need for pre-classifying, sorting, or cleaning of the waste plastic before the plastic is loaded into the pretreatment unit or the storage bins before the pretreatment unit.

The flushing stream of the present invention provide numerous advantages, including heating the waste plastic, thus reducing power usage; increasing the pressure of the melted plastic, reducing the need for additional pressurization; providing force to filter the melted plastic through the porous disk; and removing halogenated compounds from the melted plastic. The flushing stream includes steam and hydrocarbons. Advantageously, the hydrocarbons in the flushing stream interact with the plastic being melted resulting in a swelling effect which swells the plastic, making the plastic softer and easier and melt and flow, and aids in cracking. Swelled plastic is more easily cracked because the supercritical water in the supercritical water reactor can more easily penetrate the molten plastic. The steam in the flushing stream also introduces water molecules to the melting plastic, which facilitates the removal of chlorine from PVC. Water from the flushing stream acts as a catalyst and reactant in the dehalogenation reactions. The addition of steam from the flushing stream into the pretreatment area also increases the dehydrochlorination ratios, even at lower temperatures. This differs from conventional wetting systems, since wetting the plastic before introduction to the melting stage or during the melting stage does not provide the same benefits as steam since plastics are generally hydrophobic.

Additional advantageous relate to the use of the supercritical water reactor to process the molten, dechlorinated plastic. When the waste plastics include polyethylene and polypropylene, the nature of the supercritical water and the reactions that take place in the supercritical water reactor beneficially result in paraffin and olefin products. The conditions of the supercritical water reactor can suppress secondary reactions, including aromatization, dimerization, condensation, and cyclization. The use of supercritical water and the supercritical water reactor can result in higher concentrations of aromatic and naphthene in the product streams.

Referring to FIG. 1, basic supercritical water plastic conversion process 100 is depicted, and contains two major units: pretreatment unit 110 and supercritical water unit 140. Waste plastic 104 is introduced to pretreatment unit 110. Waste plastic 104 can contain a variety of polymer-based compounds, including polyolefins, polystyrenes, polyethylene terephthalate, and combinations of the same. Waste plastic 104 can contain PVC. PVC can contain chlorine content of up to 50 to 60 wt % or more. Pretreatment unit 110 allows for the melting of the plastic, generating a liquid plastic, and the dehalogenation of the plastic. In embodiments where PVC in contained in the plastic, the melting and heat treating of the plastic in the presence of steam results in the dechlorination of the plastic. Advantageously, chloride in PVC is removed through a nucleophilic substitution with water to form polyols before further reactions can occur. Ionic chain reaction can also be employed to form polyene. The polyol generated is converted to polyene by a dehydration reaction. In lower temperatures under 400° C., nucleophilic substitution is dominant. In higher temperatures greater than 400° C., ionic chain reactions are dominant. External heat can optionally be provided to pretreatment unit 110. Pretreatment unit 110 also contains a treatment system to remove contaminants from the melted liquid plastic, such as physical particulates. Multiple pretreatment units 110 can be installed in parallel or in series configurations.

Flushing stream 180 is introduced into pretreatment unit 110. Flushing stream 180 contains water at supercritical conditions or subcritical conditions, as well as product from supercritical water unit 140. The water of flushing stream 180 can be in the form of steam, or can be in subcritical liquid water conditions. Flushing stream 180 assists in the dechlorination of waste plastic 104. The water molecules present in flushing stream 180 increase the dehydrochlorination reactions. The hydrocarbon present in flushing stream 180 interacts with waste plastic 104 to swell the plastic, soften the plastic, and thus make it easier to melt and flow through the system. Pretreatment purge 190 is removed from pretreatment unit 110. Pretreatment purge 190 contains halogenated components, hydrocarbons, and steam. Pretreatment purge 190 can have a chlorine content in the range of 0.005 wt % to 0.5 wt %. In embodiments where PVC is treated, pretreatment purge 190 contains chlorinated compounds, like chlorine gas, hydrochloric acid, or other chlorinated hydrocarbons. Advantageously, the elimination of pretreatment purge 190 removes chlorinated compounds from the streams entering the subsequent reactor, which protects the subsequent reactor and later equipment from corrosion.

Molten plastic 118 is removed from pretreatment unit 110 and introduced into supercritical water unit 140. Supercritical water unit 140 is a reactor operated near, at, or above supercritical conditions for water. Supercritical water unit 140 can be any type of reactor or vessel capable of functioning at supercritical conditions for water. In some embodiments, supercritical water unit 140 consist of multiple tubular rectors with heating elements to control the temperature of the internal fluid. The dimensions of the tubular reactors can be determined by the Reynolds numbers, calculated by assuming the internal fluid is 100% water. The Reynolds number can be higher than 3,000, and preferably is higher than 6,000. The reactor can be configured in a variety of ways, and with a variety of flows, as is known in the art. The residence time of the components within supercritical water unit 140 can be in the range of 1 minute to 60 minutes, and preferably in the range of 2 minutes to 30 minutes. Supercritical water 126 is introduced into supercritical water unit 140. Supercritical water 126 contains water or steam at, near, or above supercritical conditions for water. The water within supercritical water unit 140 acts as both a reaction medium as well as a reactant, and advantageously acts as an efficient heat transfer medium. The supercritical nature of the water facilitates radical-mediated dissociation of polymer chains. Reactions occurring in supercritical water unit 140 include cracking, pyrolysis, dehydrogenation, hydrolysis, cyclization, aromatization, alkylation, dimerization, isomerization, as well as other reactions known in the art. The dissociation produces hydrocarbons, which are removed with the water phase by being dissolved. In embodiments where PVC is found in the waste plastics, the polyol and polyene generated in the dechlorination process is converted to other molecules by cracking, dehydrogenation, hydrolysis, cyclization, aromatization, dimerization, isomerization, alkylation, or other reactions known in the art in supercritical water unit 140.

Flushing stream 180 is removed from supercritical water unit 140. Product 142 is also removed from supercritical water unit 140. Product 142 contains steam or water near or at supercritical conditions for water, and hydrocarbon product. Product 142 can include hydrocarbons, oils, paraffins, olefins, naphthene, aromatic compounds, and other polymer components. In some embodiments where waste plastic 104 is primarily polyethylene and polypropylene, paraffins and olefins are dominant in product 142. Product 142 can be an upgraded hydrocarbon. Product 142 can have hydrocarbons with boiling points ranging from an FBP (final boiling point) of 180° C. (corresponding to light naphtha) to an FBP of 560° C. (corresponding to vacuum gas oil), with trace amounts of heavy fractions with boiling points higher than 560° C. Flushing stream 180 can be additionally heated before introduction to pretreatment unit 110.

Figure 2:
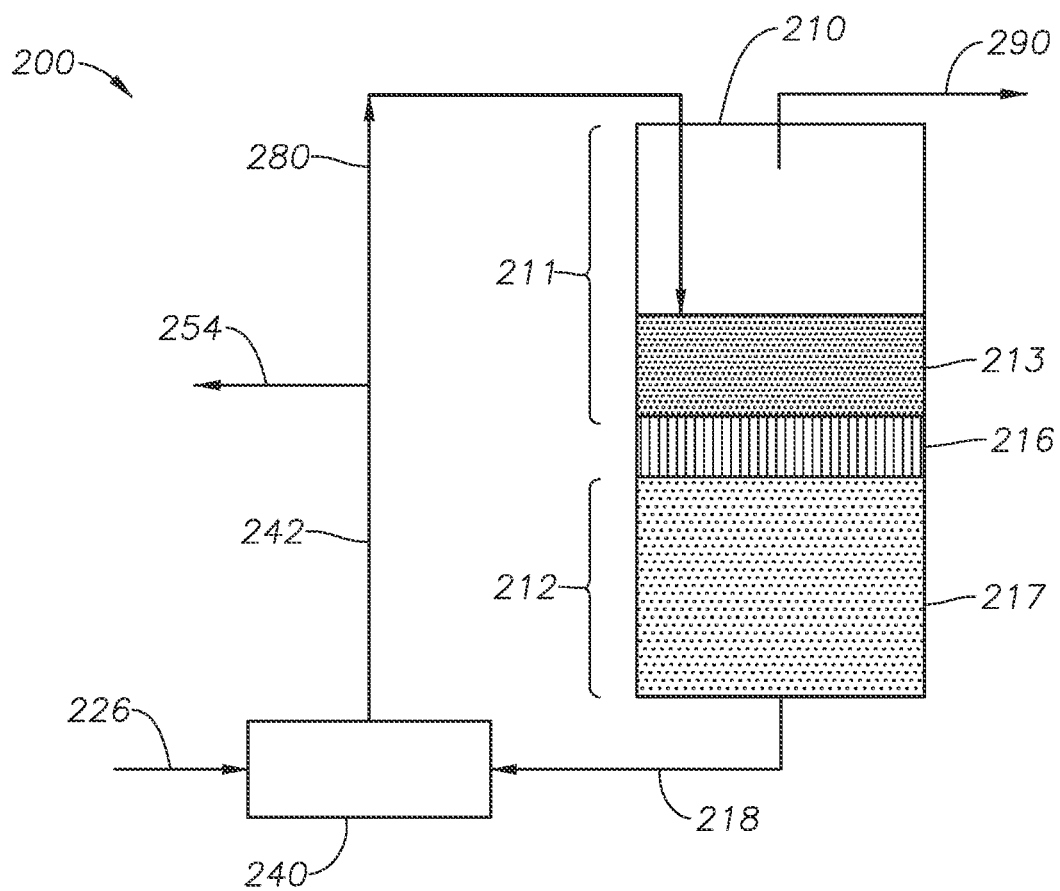
FIG. 2 is a depiction of a pretreatment unit, according to an embodiment.

Referring to FIG. 2, pretreatment unit system 200 is shown and includes pretreatment unit 210. Pretreatment unit 210 can have the same characteristics as pretreatment unit 110. Pretreatment unit features two sections: melting section 211 and liquid collection section 212, separated by porous disk 216. Waste plastic is added to melting section 211 of pretreatment unit 210. Advantageously, the waste plastic does not need to be dry or pre-washed before addition to pretreatment unit 210. Melting section 211 heats waste plastic, melting the plastic into a liquid state. Optional heating elements can be used to melt waste plastic in melting section 211. The temperature of molten plastic 118 is maintained above 120° C. and below 400° C. Optional agitators or mixers can also be used for uniform heat transfer.

Flushing stream 280 is introduced to melting section 211 of pretreatment unit 210, and can have the same characteristics as flushing stream 180. Flushing stream 280 advantageously heats dechlorinated molten plastic 213 in pretreatment unit 210, and provides additional water for efficient heat transfer. Flushing stream 280 maintains the pressure of melting section 211 above 0.2 MPa and below 20 MPa. Pretreatment purge 290 is removed from melting section 211 of pretreatment unit 210. Pretreatment purge 290 can have the same characteristics as pretreatment purge 190. Melting section 211 melts the waste plastic, generating dechlorinated molten plastic 213. As the plastic melts, chlorine gas is emitted, and removed through pretreatment purge 290.

The dechlorinated molten plastic 213 passes through porous disk 216. Flushing stream 280 can provide pressure to force dechlorinated molten plastic 213 through porous disk 216. Porous disk 216 can include straight-thru pores with diameters between 0.01 mm and 20 mm, and preferably between 0.1 mm and 5 mm. Porous disk 216 maintains pressure within melting section 211. Porous disk 216 can include metallic or ceramic disks with one or more layers. Preferably, porous disk 216 is made of corrosion resistant metals such as high nickel alloys, including Hastelloy-C and Inconel 625. In some embodiments, the multiple layers have differing pore sizes. Porous disk 216 removes solid particulates and other contaminants such as metals from dechlorinated molten plastic 213, advantageously reducing complications from contamination. Porous disk 216 can be regenerated by back flushing, incineration, steaming, or replacement. Cleaned molten plastic 217 collects in liquid collection section 212 of pretreatment unit 210. Liquid collection section 212 can be heated to between 120° C. and 350° C.

Molten plastic 218 is removed from liquid collection section 212 of pretreatment unit 210, and can have the same characteristics as molten plastic 118. Molten plastic 218 is introduced into supercritical water unit 240, which can have the same characteristics as supercritical water unit 140. Some hydrocarbon products within flushing stream 280 that interact with dechlorinated molten plastic 213 can collect within molten plastic 218 and be transferred to supercritical water unit 240. Supercritical water 226, which can have the same characteristics as supercritical water 126, is introduced to supercritical water unit 240. Product 242, which can have the same characteristics as product 142, contains steam or water at or near supercritical conditions for water, and product, and is generated from supercritical water unit 240. Product 242 is split into split product 254 and flushing stream 280. No component separation occurs during the split—product 242 is split into two streams generating flushing stream 280 and spilt product 254 with the same physical or chemical characteristics. In some embodiments, the mass flow rate ratio of flushing stream 280 to split product 254 is in the range of 0.02 to 5.

Figure 3:
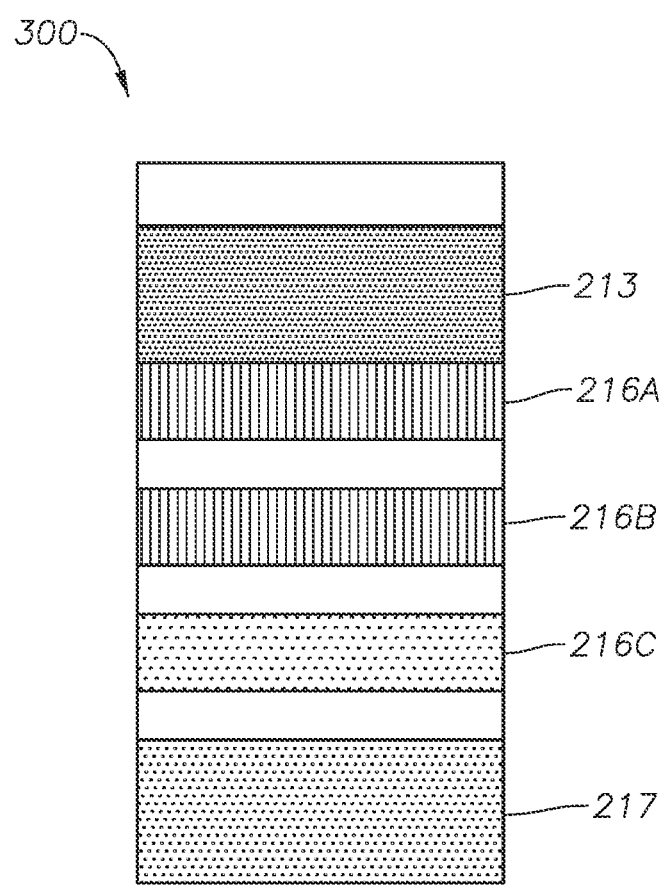
FIG. 3 is a depiction of a pretreatment unit with multiple filters, according to an embodiment.

Referring to FIG. 3, pretreatment unit with multiple filters 300 is shown. Instead of one porous disk, pretreatment unit with multiple filters 300 features three porous disks: porous disk A 216A, porous disk B 216B, and porous disk C 216C. The three porous disks can be made of the same or similar materials, or different materials. The three porous disks can have the same or similar filtration pores, or have different filtration pores. Voids or spaces can exist between the multiple porous disks.

Figure 4:
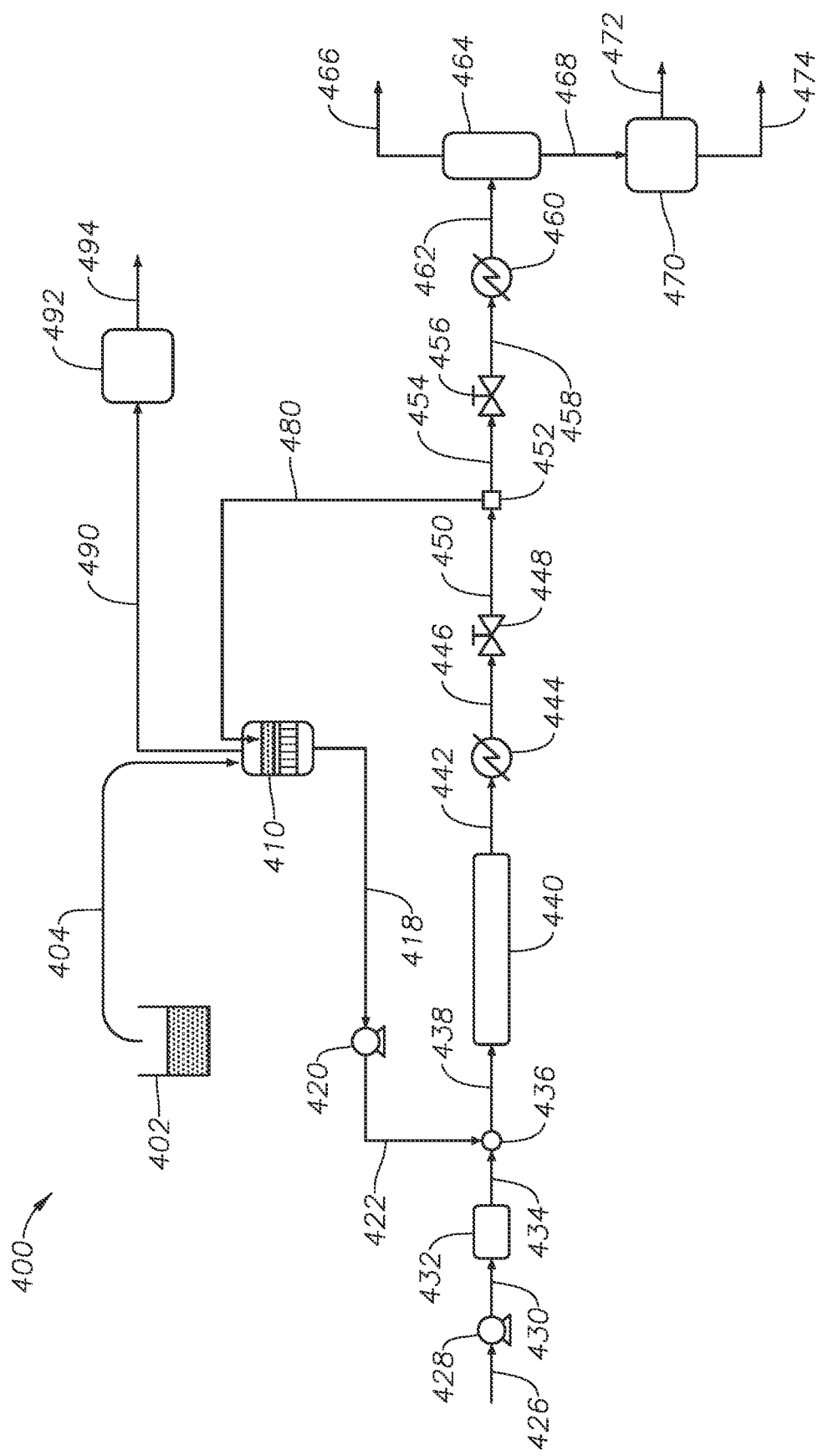
FIG. 4 is a process diagram of a supercritical water plastic conversion process, according to an embodiment.

Referring to FIG. 4, supercritical water plastic conversion process 400 is shown. Waste plastic 404 is stored in and removed from waste plastic storage bin 402, which can be loaded in batch or continuous modes. Waste plastic 404 can have the same or similar characteristics to waste plastic 104 and waste plastic 204. Waste plastic 404 is introduced to pretreatment unit 410, which can have the same or similar characteristics as pretreatment unit 110, pretreatment unit 210, and pretreatment unit with multiple filters 300. Pretreatment unit 410 can be operated with pressures in the range of 0.5 MPa to 22 MPa, preferably in the range of 1 MPa to 10 MPa, and temperatures in the range of 120° C. to 400° C., preferably 150° C. to 350° C. Flushing stream 480 is introduced to pretreatment unit 410, and can have the same or similar characteristics to flushing stream 180 and flushing stream 280. Flushing stream 480 can have a pressure in the range of 0.5 MPa to 22 MPa, preferably in the range of 1 MPa to 10 MPa. Flushing stream 480 can have a temperature in the range of 120° C. to 400° C., preferably 150° C. to 300° C. Pretreatment purge 490, which can have the same or similar characteristics as pretreatment purge 190 and pretreatment purge 290, is removed from pretreatment unit 410. Pretreatment purge 490 can have a pressure in the range of 0.5 MPa to 22 MPa, preferably in the range of 1 MPa to 10 MPa. Pretreatment purge 490 can have a temperature in the range of 120° C. to 400° C., preferably 150° C. to 300° C. The chlorine content of pretreatment purge 490 varies depending on the flow rate of flushing stream 480 and the PVC content of waste plastic 404; however, in some embodiments, the chlorine content of pretreatment purge 490 can be in the range of 0.005 wt % and 0.5 wt %.

Pretreatment purge 490 is introduced to dechlorination process 492. Dechlorination process 492 can be any type of process, unit, or system operable to remove chlorine from a stream. Dechlorination process 492 can be an adsorption unit, an absorption unit, a neutralization tank, an alkali-solvent system, a reactor, a scrubber, or any other device known in the art. The sizing of dechlorination process 492 can be dependent upon the mass flow rate ratio of flushing stream 480 to pressurized molten plastic 422. Dechlorinated product 494 is generated from dechlorination process 492, and contains product substantially free from or with low quantities of chlorine or chlorinated compounds.

Molten plastic 418 is removed from pretreatment unit 410, and can have the same or similar characteristics as molten plastic 118 and molten plastic 218. Molten plastic 418 can have a temperature in the range of 120° C. to 350° C., preferably 150° C. to 300° C. Molten plastic 418 is introduced to molten plastic pump 420. Molten plastic pump 420 can be any type of pump capable of raising the pressure of molten plastic 418 such that the stream can be introduced into the supercritical conditions of the supercritical water unit. Pressurized molten plastic 422 is introduced into mixer 436. Pressurized molten plastic 422 can have a pressure in the range of 22 MPa to 35 MPa, preferably in the range of 23 MPa to 30 MPa.

Water 426 is introduced to water pump 428 which raises the pressure of the water, generating stream 430. Stream 430 can have a pressure in the range of 22 MPa to 35 MPa, preferably in the range of 23 MPa to 30 MPa. Water 426 can be a demineralized water, with a conductivity less than 1 microsiemens (µS)/centimeters (cm); preferably, less than 0.5 µS/cm; and more preferably, equal to or less than 0.1 µS/cm. In preferred embodiments the sodium content is less than 5 µg/L, and the silica content is less than 3 µg/L. Stream 430 is introduced to pre-heater 432, which raises the temperature of the water, generating supercritical water stream 434. Supercritical water stream 434 is at or above supercritical conditions for water. Supercritical water stream 434 can have a temperature in the range of 374° C. to 600° C., preferably 400° C. to 550° C. Supercritical water stream 434 is introduced to mixer 436, which mixes supercritical water stream 434 and pressurized molten plastic 422, generating supercritical unit feed 438. Mixer 436 can be a static mixer, agitator-equipped vessel, tee-fitting, or any other mixer known in the art. Supercritical unit feed 438 can have a pressure in the range of 22 MPa to 35 MPa, preferably in the range of 23 MPa to 30 MPa. Supercritical unit feed 438 can have a temperature in the range of 300° C. to 550° C., preferably in the range of 380° C. to 450° C. The ratio of the mass flow rate of pressurized molten plastic 422 to the mass flow rate of supercritical water stream 434 fed to mixer 436 can be in the range of 1:0.1 to 1:10; preferably in the range of 1:0.5 to 1:3.

Supercritical unit feed 438 is introduced to supercritical water unit 440. Supercritical water unit 440 can have the same or similar characteristics as supercritical water unit 140 and supercritical water unit 240. Supercritical water unit 440 generates product 442, which can have the same or similar characteristics as product 142 and product 242. Product 442 can include hydrocarbons and water. Product 442 can have a pressure in the range of 22 MPa to 35 MPa, preferably in the range of 23 MPa to 30 MPa. Product 442 can have a temperature in the range of 400° C. to 550° C., preferably in the range of 420° C. to 500° C. Product 442 is introduced into cooler 444, which reduces the temperature of the product, generating stream 446. Stream 446 can have a temperature in the range of 120° C. to 400° C., preferably in the range of 150° C. to 300° C. Stream 446 is introduced into depressurizing device 448, which reduces the pressure of stream 446, generating depressurized stream 450. Depressurized stream 450 can have a pressure in the range of 0.5 MPa to 22 MPa, preferably in the range of 1 MPa to 10 MPa. Preferably, depressurizing device 448 is a series of devices that gradually reduces the pressure of stream 446.

Depressurized stream 450 is introduced into splitter 452. Splitter 452 divides depressurized stream 450 into split product 454 and flushing stream 480, which share the same or similar characteristics. Split product 454 is introduced into valve 456, which controls the amount of flushing stream 480 sent to pretreatment unit 210. A flow control valve (not pictured) located on gas product 466 also controls the amount of flushing stream 480 sent to pretreatment unit 210. The mass flow rate ratio of flushing stream 480 to pressurized molten plastic 422 is in the range of 0.02 to 5.0. Stream 458 is removed from valve 456, and is introduced into product cooler 460. Product cooler 460 reduces the temperature of stream 458, generating cooled product 462. Cooled product 462 can have a temperature in the range of 30° C. to 90° C. Cooled product 462 can have a pressure in the range of atmospheric pressure to 0.5 MPa. Cooled product 462 is introduced into gas liquid separator 464, which separates the gas phrase from the liquid phase, generating gas product 466, which contains gaseous hydrocarbons. Liquid product 468 is also generated from gas liquid separator 464, and contain the liquid phase. Liquid product 468 is introduced into oil water separator 470, which separates the oil phase from the water phase. Oil product 472 is removed from oil water separator 470, containing hydrocarbons. Water product 474 is removed from oil water separator 470, containing water.

Figure 5:
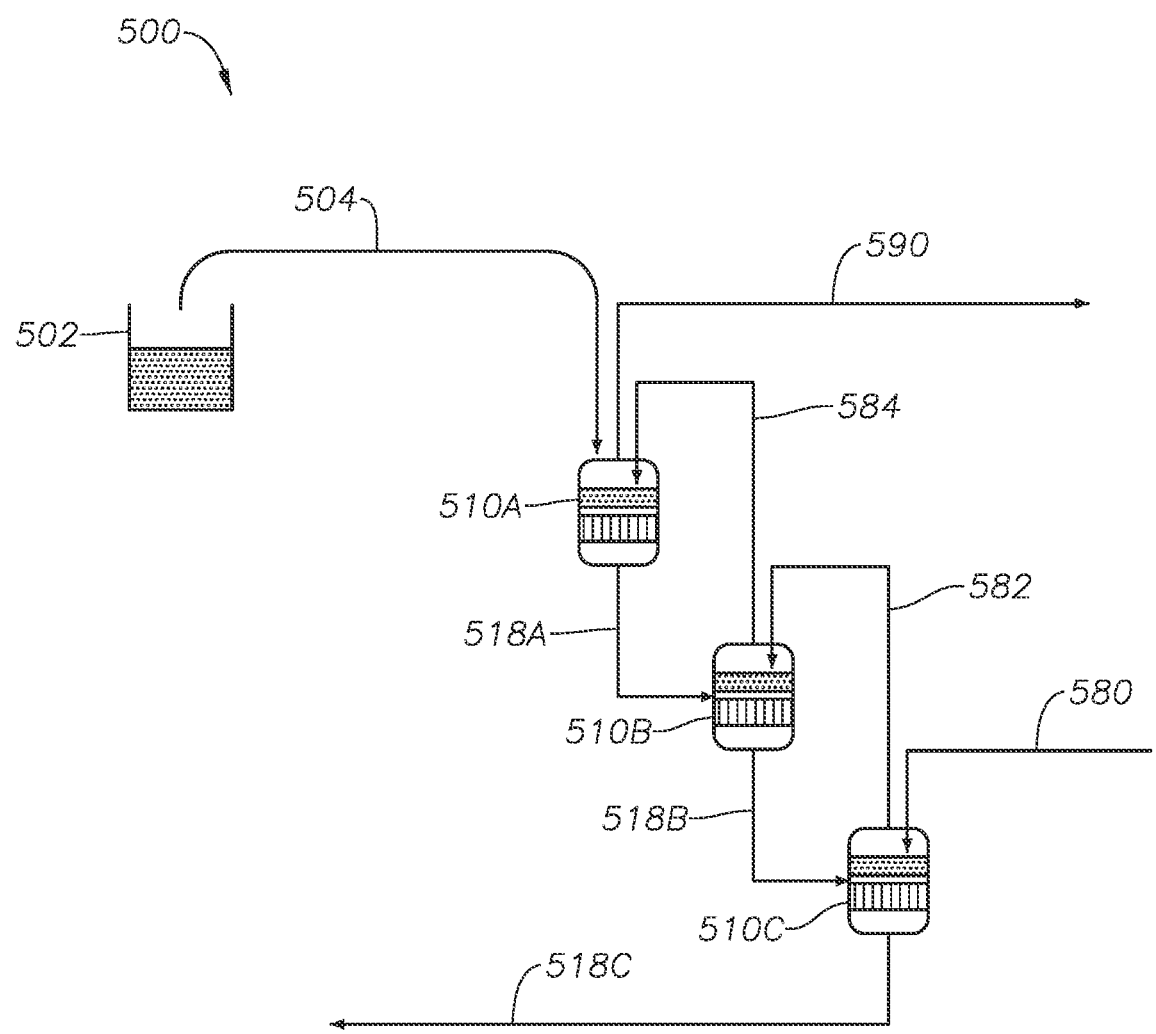
FIG. 5 is a diagram of multiple pretreatment units placed in series, according to an embodiment.

Referring to FIG. 5, multiple pretreatment units placed in series system 500 is shown. Three pretreatment units 510A, 510B, and 510C are shown in series. The overhead from the lower pretreatment units is sent to the pretreatment units upstream. Waste plastic storage bin 502, having the same or similar characteristics as waste plastic storage bin 402, feeds waste plastic 504, having the same of similar characteristics as waste plastic 104, waste plastic 204, and waste plastic 404, is introduced into pretreatment unit 510A. Pretreatment purge 590, having the same or similar characteristics as pretreatment purge 190, pretreatment purge 290, and pretreatment purge 490, is removed from pretreatment unit 510A. Second overhead recycle 584 is introduced into pretreatment unit 510A. Molten plastic 518A, which has the same or similar characteristics as molten plastic 418, from pretreatment unit 510A is introduced into pretreatment unit 510B, which has the same or similar characteristics as pretreatment unit 510A. First overhead recycle 582 is introduced into pretreatment unit 510B. Pretreatment unit 510B generates second overhead recycle 584, which has the same or similar characteristics as flushing stream 580, and molten plastic 518B, which has the same or similar characteristics as molten plastic 518A.

Molten plastic 518B is introduced into pretreatment unit 510C, which has the same or similar characteristics to 510B. Flushing stream 580, which has the same or similar characteristics of flushing stream 180, flushing stream 280, and flushing stream 480, is introduced into pretreatment unit 510C. Pretreatment unit 510C generates first overhead recycle 582, and molten plastic 518C. Molten plastic 518C, which has the same or similar characteristics as molten plastic 518B, can then be introduced into the supercritical water unit (not pictured). Advantageously, the use of multiple pretreatment units can result in exposure to the flushing streams for longer periods of time, resulting in a higher dechlorination rate. Additionally, the HCl released from the later pretreatment units and recycled to the earlier pretreatment units can act as a catalyst to enhance dechlorination reactions in the earlier pretreatment units, as HCl has an autocatalytic effect on PVC degradation.

The singular forms "a," "an," and "the" include plural referents, unless the context clearly dictates otherwise.

As used in the specification and in the appended claims, the words "has," "contains," and "include" and all grammatical variations thereof are each intended to have an open, non-limiting meaning that does not exclude additional elements or steps.

I claim:

1. A method of processing waste plastic, the method comprising the steps of:
    introducing waste plastic into a pretreatment unit, wherein the waste plastic comprises a halogen;
    heating the waste plastic in the pretreatment unit such that molten plastic is generated;
    introducing the molten plastic into a supercritical water unit, wherein the supercritical water unit is operable at supercritical conditions for water;
    introducing a supercritical water stream to the supercritical water unit;
    reacting the molten plastic in the supercritical water stream to generate a product, wherein the product comprises hydrocarbons;
    removing a flushing stream from the supercritical water unit, the flushing stream comprising the product and water; and
    introducing the flushing stream from the supercritical water unit into the pretreatment unit.

2. The method of claim 1, further comprising the steps of:
    dehalogenating the molten plastic in the pretreatment unit; and
    removing a pretreatment purge from the pretreatment unit, the pretreatment purge comprising halogens, the product, and steam.

3. The method of claim 1, wherein the pretreatment unit comprises a porous disk, the porous disk operable to remove solid particulates from the molten plastic.

4. The method of claim 3, wherein the flushing stream is introduced into the supercritical water unit at a pressure operable to force the molten plastic through the porous disk, wherein the pressure is in the range of 0.5 MPa to 22 MPa.

5. The method of claim 4, wherein the porous disk comprises metal.

6. The method of claim 1, wherein the product comprises hydrocarbons with a final boiling point in the range of 180° C. to 560° C.

7. The method of claim 1, wherein the waste plastic comprises polyvinyl chloride (PVC).

8. The method of claim 2, wherein the pretreatment purge comprises chlorinated compounds.

9. The method of claim 1, wherein the flushing stream cracks a portion of the molten plastic in the pretreatment unit.

10. The method of claim 1, wherein the supercritical water unit operates at a pressure in the range of 22 MPa to 35 MPa, and a temperature in the range of 400° C. to 550° C.

11. A method for the hydrothermal conversion of waste plastic to hydrocarbons, the method comprising the steps of:
    introducing waste plastic to a pretreatment unit, wherein the waste plastic comprises polyvinyl chloride (PVC);
    introducing a flushing stream to the pretreatment unit, wherein the flushing stream comprises water and hydrocarbons;
    melting the waste plastic in a melting section of the pretreatment unit, generating a molten plastic;
    dechlorinating the molten plastic in the melting section, generating a dechlorinated molten plastic;

removing a pretreatment purge from the melting section of the pretreatment unit, wherein the pretreatment purge comprises chlorine, hydrocarbons, and water;

filtering the dechlorinated molten plastic through a porous disk, generating a cleaned molten plastic;

introducing the cleaned molten plastic into a supercritical water unit;

introducing a supercritical water stream into the supercritical water unit;

reacting the supercritical water stream and the cleaned molten plastic, generating hydrocarbons;

removing a product stream from the supercritical water unit, wherein the product stream comprises hydrocarbons and water; and splitting the flushing stream from the product stream.

12. The method of claim 11, wherein the supercritical water unit operates at a pressure in the range of 22 MPa to 35 MPa, and a temperature in the range of 400° C. to 550° C.

13. The method of claim 11, further comprising the step of pumping the cleaned molten plastic, such that the pressure of the cleaned molten plastic is at or near pressure conditions for supercritical conditions for water.

14. The method of claim 11, wherein the step of reacting the supercritical water and the cleaned molten plastic comprises hydrothermal conversion.

15. The method of claim 11, wherein the flushing stream partially cracks the dechlorinated molten plastic in the pretreatment unit.

16. The method of claim 11, further comprising the steps of:

separating a remaining portion of the product stream in a separator, wherein the splitting of the flushing stream from the product stream generates the remaining portion of the product stream, generating a gaseous product and a liquid product; and dechlorinating the pretreatment purge in a dechlorination process, generating a dechlorinated product.

17. The method of claim 11, wherein the porous disk is operable to remove solid particulates.

18. The method of claim 11, further comprising a plurality of pretreatment units, the plurality of pretreatment unit arranged in series.

19. The method of claim 18, wherein an overhead recycle is recycled from a second of the plurality of pretreatment units to a first of the plurality of pretreatment units.

20. The method of claim 11, wherein the pretreatment unit operates at a pressure in the range of 0.5 MPa to 22 MPa, and at a temperature in the range of 120° C. to 400° C.

* * * * *